March 1, 1960     J. F. FROLA     2,926,758
HYDRO-PNEUMATIC TYPE TREAD BRAKE UNIT FOR RAILWAY CARS
Filed Oct. 23, 1957     5 Sheets-Sheet 1

INVENTOR.
Joseph F. Frola
BY
ATTORNEY

March 1, 1960

J. F. FROLA 2,926,758

HYDRO-PNEUMATIC TYPE TREAD BRAKE UNIT FOR RAILWAY CARS

Filed Oct. 23, 1957

INVENTOR.
Joseph F. Frola
BY
Adelbert A. Steinmiller
ATTORNEY

March 1, 1960 J. F. FROLA 2,926,758
HYDRO-PNEUMATIC TYPE TREAD BRAKE UNIT FOR RAILWAY CARS
Filed Oct. 23, 1957 5 Sheets-Sheet 3

INVENTOR.
Joseph F. Frola
BY
Adelbert A. Steinmiller
ATTORNEY

INVENTOR.
Joseph F. Frola
BY
Adelbert A. Steinmiller
ATTORNEY

March 1, 1960
J. F. FROLA
2,926,758
HYDRO-PNEUMATIC TYPE TREAD BRAKE UNIT FOR RAILWAY CARS
Filed Oct. 23, 1957
5 Sheets-Sheet 5
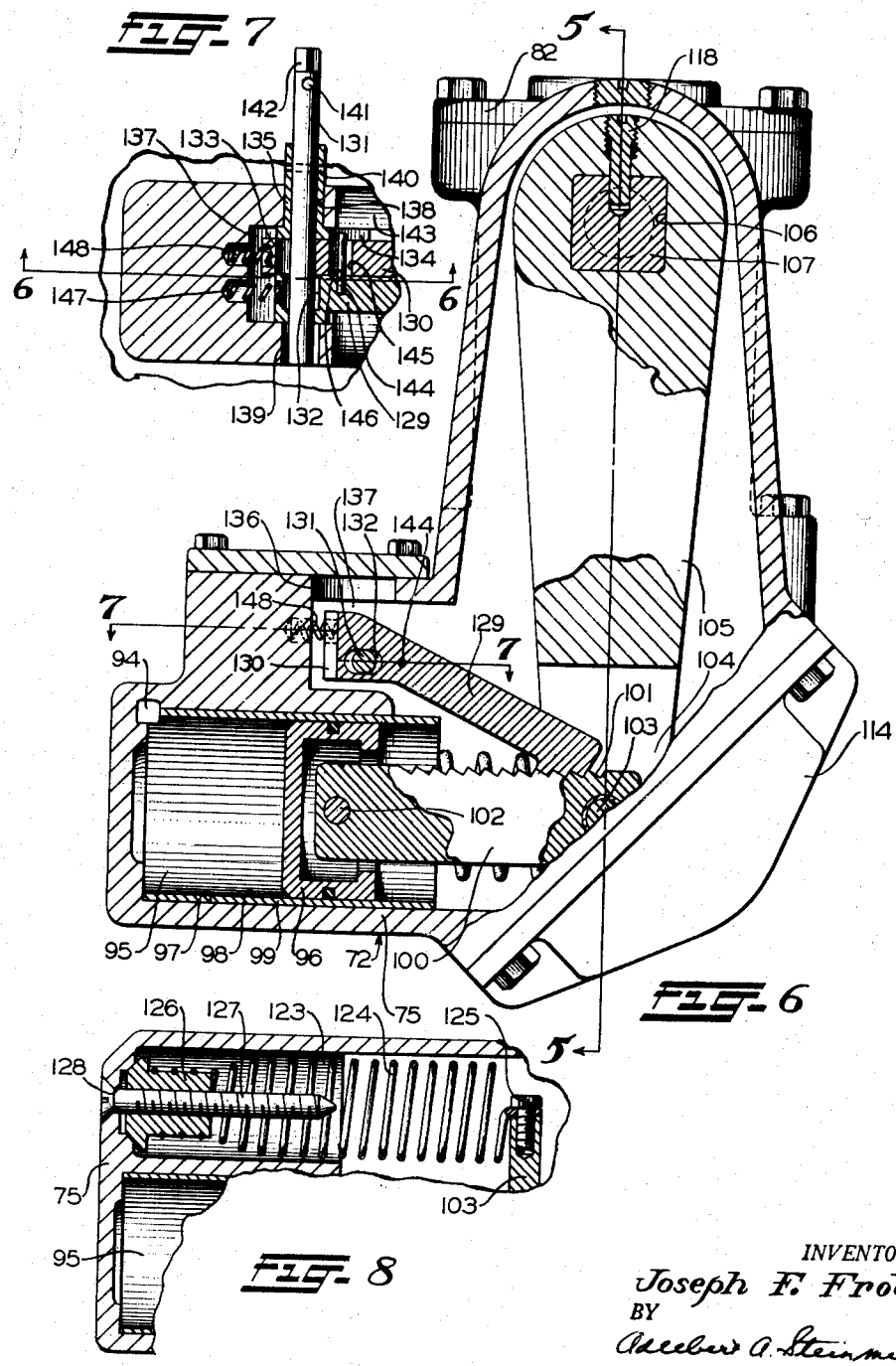
INVENTOR.
Joseph F. Frola
BY
ATTORNEY //  # United States Patent Office 2,926,758
Patented Mar. 1, 1960

2,926,758

HYDRO-PNEUMATIC TYPE TREAD BRAKE UNIT FOR RAILWAY CARS

Joseph F. Frola, Braddock, Pa., assignor to Westinghouse Air Brake Company, Wilmerding, Pa., a corporation of Pennsylvania Application October 23, 1957, Serial No. 691,977

7 Claims. (Cl. 188—153)

This invention relates to tread brake apparatus for railway rolling stock and more particularly to a hydro-pneumatic type of tread brake unit for freight cars.

One of the present day conventional brake riggings for freight cars consists of one or more brake cylinders carried on the underside of the car body and having the piston rods thereof connected through rods and levers to the brake shoes, independently hung on brake shoe hangers from the truck frame, to effect movement of all of the brake shoes on the car into and out of engagement with the tread of the car truck wheels.

The conventional type of brake rigging cannot conveniently be employed on the new type of lightweight cars due to limitations of space and weight requirements.

It is accordingly the principal object of the present invention to provide a small, lightweight, compact, independently operated hydro-pneumatic brake unit for each individual wheel of a railway car truck.

Another object of the invention is to provide a brake unit in which the hydraulic and pneumatic cylinders may be arranged to suit the space available on the car truck for mounting the unit.

A further object is to provide a self-contained hydro-pneumatic brake unit in which all hydraulic piping, and consequent possible loss of braking liquid resulting from ruptured piping, is eliminated.

A further object is to provide an individually and independently mountable and removable hydro-pneumatic brake unit having a novel arrangement of a slack adjusting mechanism therein for compensating for the wear of the brake shoe associated with a single wheel of a railway car truck.

Other objects and advantages will be apparent from the following detailed description of the invention.

In the accompanying drawings:

Fig. 4 is a fragmental cross-sectional view, showing a different construction for attaching one of the pistons in Fig. 2 to its piston rod.

Fig. 6 is a cross-sectional view, taken on the line 6—6 of Fig. 5, looking in the direction of the arrows and showing details of a slack take-up mechanism of different type than that in Fig. 3.

Fig. 7 is a cross-sectional view, taken on the line 7—7 of Fig. 6 and showing certain additional details of the slack take-up mechanism of Fig. 6.

Fig. 8 is a fragmental cross-sectional view, taken on the line 8—8, of Fig. 5, looking in the direction of the arrows and showing an adjustable tensioned spring for releasing the brakes connected to the piston rod of the hydraulic brake applying piston.

Figures 1 to 4

Figure 1:
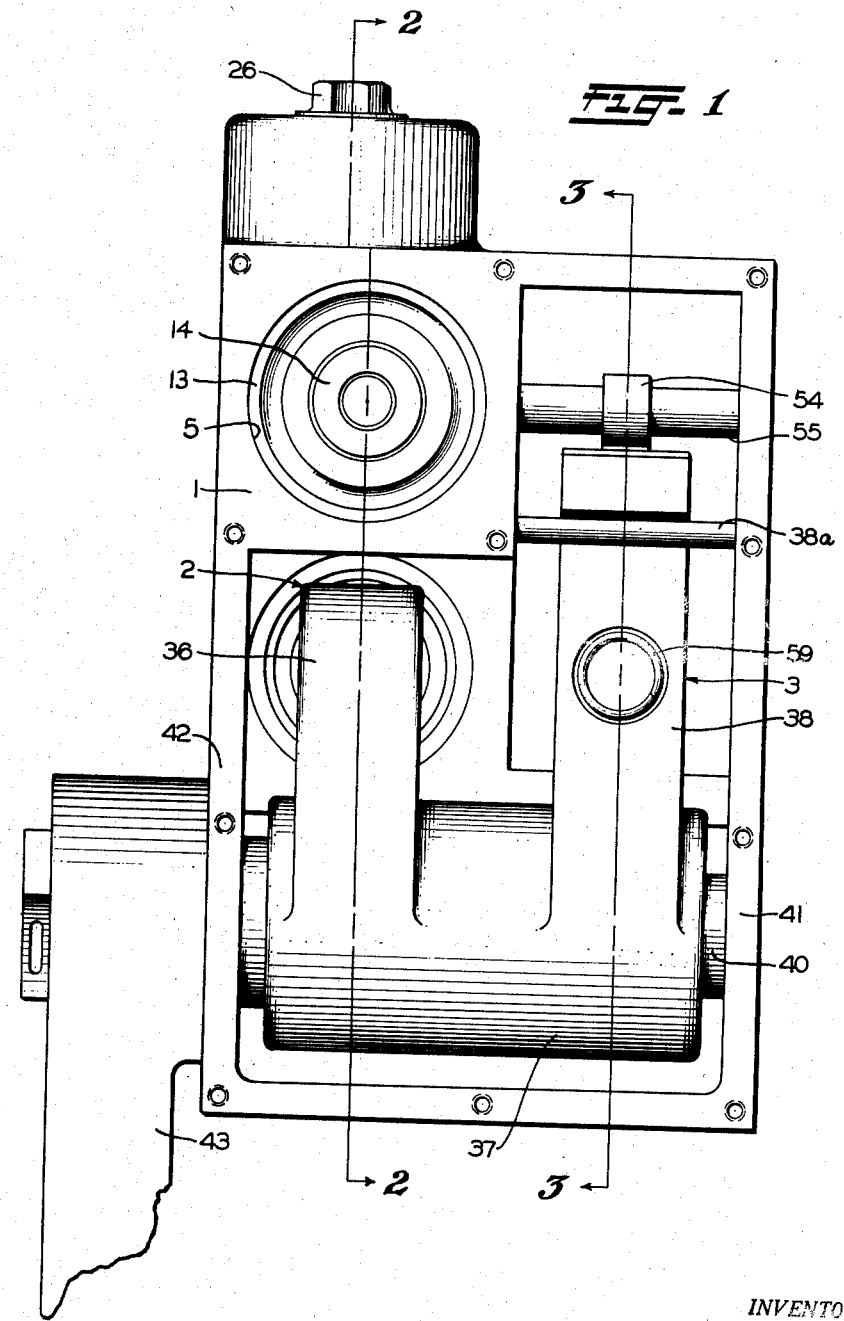
Fig. 1 is an end elevational view of a brake unit, with an end cover removed, embodying one form of the invention.

As shown in Fig. 1 of the drawings, the hydro-pneumatic brake unit, one of which is provided for each wheel of a railway vehicle truck, comprises a casing 1 in which is housed in spaced apart parallel relationship a hydro-pneumatic brake application and release portion 2 and a slack adjusting mechanism 3.

Figure 2:
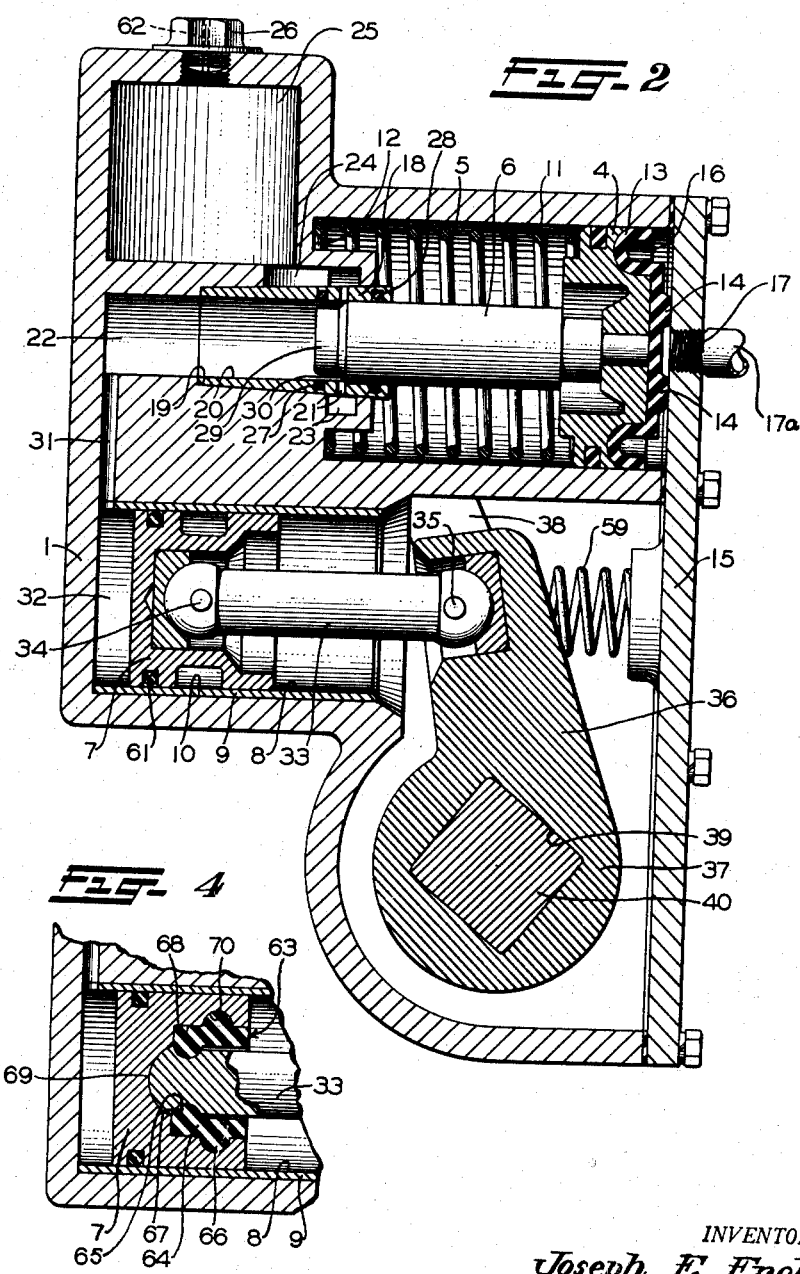
Fig. 2 is a cross-sectional view, taken on the line 2—2 of Fig. 1, looking in the direction of the arrows and showing the relation between the pneumatic and hydraulic fluid motors of the brake unit.

The hydro-pneumatic brake application and release portion 2 is shown in detail in Fig. 2, and comprises a pneumatic pressure actuated power piston 4 slidably mounted in a bore 5 formed in body 1, a master hydraulic piston 6, operatively connected to the pneumatic power piston 4, and a hydraulic pressure actuated brake applying piston 7 slidably mounted in a bore 8 in a bushing 9 pressed into a bottomed bore 10 formed in casing 1 in spaced-apart parallel relationship with bore 5 in said casing.

A spring 11 interposed between piston 4 and a wall 12 located at the left-hand end of bore 5 serves to yieldingly bias pistons 4 and 6 in a brake releasing direction to the position in which they are shown in Fig. 2 of the drawings.

Formed on a packing cup 13 secured to the piston 4 are a plurality of lugs 14 which, when piston 4 occupies the position in which it is shown in Fig. 2, contact an end cover or pressure head 15 to form a pressure chamber 16 to which pneumatic pressure may be supplied through a port 17 and a pipe 17a which is connected as by means of a flexible hose (not shown) to the brake cylinder pipe of a control valve, such as an "AB" valve, of the usual air brake system on railway freight cars.

A tapered bushing 18 is press fitted into a tapered counterbore 19 in the casing 1. A bore 20 through the bushing 18 is adapted to receive the left-hand end of master hydraulic piston 6. A plurality of radial ports 21 in bushing 18 connect the interior bore of the bushing, and a cylindrical chamber 22 of corresponding diameter formed in casing 1 coaxial with said bushing bore, to an annular passageway 23 formed in casing 1 and extending circumferentially around said bushing. The passageway 23 is connected by a port 24 to an hydraulic fluid reservoir 25 formed in casing 1. The reservoir 25 may be filled with oil or some other suitable hydraulic fluid through a vented removable filling cap 26 screw-threaded into the casing 1.

The bushing 18 is provided intermediate its ends and on opposite sides of ports 21 with two, axially spaced-apart resilient O-rings 27 and 28 disposed in corresponding annular recesses open to the interior surface of said bushing. These O-rings have sealing and sliding contact with the periphery of piston 6 to minimize leakage of fluid pressure from chamber 22 to the annular passageway 23 and from said passageway to the interior of bore 5 when piston 6 is moved in the direction of the left hand. The left-hand end of piston 6 is provided with a cylindrical reduced portion 29 which is connected by a conical portion 30 to the remainder of said piston. When piston 6 is pushed into bore 20 of bushing 18 by pneumatic pressure in chamber 16 acting on piston 4, conical portion 30 engages the inner diameter of O-ring 27 and forces, or squeezes, it into its annular recess without cutting or otherwise injuring it.

A passageway 31 formed in casing 1 connects chamber 22 to a chamber 32 formed between the left-hand face of piston 7 and the end wall of bore 10. This passageway permits flow of hydraulic fluid from chamber 22 to chamber 32 to move piston 7 in the direction of the right hand when piston 6 is moved in the direction of the left hand in response to the supply of pneumatic pressure to chamber 16.

A piston rod 33 is pivotally connected at one end to piston 7, as by a pin 34, and at the other end, as by a pin 35, to one end of a brake lever 36. The brake lever 36 extends outward from a hub 37 from which also extends an arm 38 arranged in spaced-apart parallel relationship to brake lever 36, said arm constituting a part of the hereinafter described slack adjusting mechanism 3. The hub 37 is provided with a square bore 39 to permit said hub to be mounted on a square portion of a shaft 40. The ends of the shaft 40 are cylindrical and of unequal diameter to permit assembling the hub 37 on the shaft. The smaller end of shaft 40 is carried in a first bearing (not shown) mounted in a right-hand side wall 41 of casing 1 (as viewed in Fig. 1), and the larger end of said shaft is carried in a second bearing (not shown) mounted in a left-hand side wall 42 of said casing. The left-hand end of shaft 40 extends beyond the wall 42 to the exterior of casing 1 and has rigidly mounted thereon one end of a brake arm 43.

The opposite end of arm 43 (Fig. 3) has pivotally mounted thereon, as by a bolt 44, and a nut 45, a brake head 46 which carries a composition type brake shoe 47 for contacting the tread 48 of a railway car wheel 49. The arm 43 is provided with a lug 50 which is disposed substantially parallel to a lug 51 extending from a boss 52 formed on brake head 46. Disposed between lugs 50 and 51 is a spring 53 which urges lug 51 and consequently brake head 46 in a counterclockwise direction about bolt 44 to prevent the top of brake shoe 47 from contacting or riding the tread 48 of wheel 49 when the brakes are released.

A hydro-pneumatic brake unit for each wheel of a railway vehicle truck includes the hydro-pneumatic application and release portion 2 and the slack adjusting mechanism 3 carried within the casing 1, the brake arm 43, brake head 46 and the brake shoe 47. A brake unit is disposed adjacent each truck wheel and the casing 1 is suitably mounted on or attached to the inboard side of a truck side frame.

Figure 3:
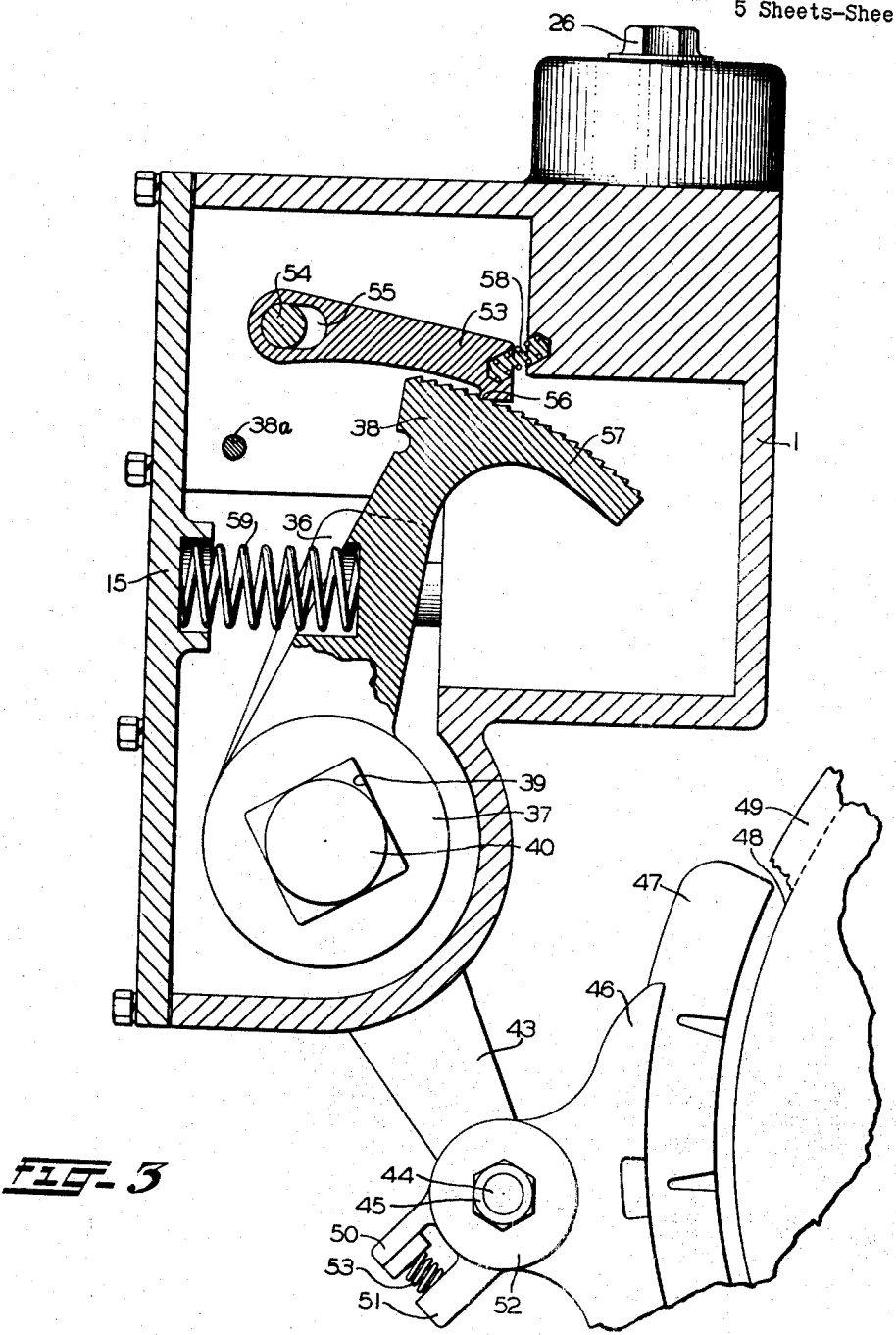
Fig. 3 is a cross-sectional view, taken on the line 3—3 of Fig. 1, looking in the direction of the arrows and showing the details of a slack take-up mechanism for taking up the slack occurring in response to the wearing away of a brake shoe.

The slack adjusting mechanism 3 comprises, in addition to the arm 38, a locking pawl 53 pivotally mounted at one end on a pin 54 extending through an elongated slot 55 in said pawl and anchored at each end in casing 1. The other end of pawl 53 is adapted to engage a tooth 56 of an arcuate toothed rack 57 formed on the outer end of arm 38. A groove formed on the left-hand side of arm 38 is adapted to contact a pin 38a carried by the casing 1 to limit counterclockwise rocking of arm 38. A spring 58 disposed between casing 1 and pawl 53 acts to normally maintain the right-hand end of said pawl in engagement with one tooth on rack 57 and to permit said end to ratchet over a tooth on rack 57 when arm 38 is first rocked counterclockwise through an angle sufficient to allow spring 58 to move pawl 53 from the position in which it is shown in Fig. 3 to a position in which pin 54 engages the right-hand end of elongated slot 55 and then through an angle equal to the included angle between two adjacent teeth on rack 58. The length of slot 55 in pawl 53 is so chosen as to permit brake shoe 47 to be brought into contact with tread 48 of wheel 49 simultaneously with pin 54 contacting the right-hand end of elongated slot 55.

A spring 59 interposed between the arm 38 and the end cover 15 serves to yieldingly bias the arm 38, the brake lever 36, the piston 7, the brake arm 43 and the connected brake shoe 47 in a brake releasing direction to the position in which they are shown in Figs. 2 and 3. When it is desired to effect a brake application, fluid under pressure, that is pneumatic pressure, is supplied to the pressure chamber 16 through the port 17 and pipe 17a from the usual air brake system on railway freight cars. Fluid under pressure thus supplied to the chamber 16 (Fig. 2), formed between the packing cup 13 and the end cover or pressure head 15, is effective to displace the packing cup 13 and pistons 4 and 6 in the direction of the left hand with respect to the casing 1 against the force of spring 11.

As the piston 6 is displaced as described above, the left-hand end of the piston will first cover the ports 21 which control communication between the chambers 22 and 25. As the piston 6 continues to be displaced in the direction of the left hand, the conical portion 30 contacts the inner periphery of the O-ring 27 and forces or squeezes this O-ring into the annular recess in which it is disposed until the inside diameter of O-ring 27 is equal to the outside diameter of the piston 6. When the inside diameter of the O-ring 27 has been increased until this diameter is equal to the outside diameter of the piston 6, the piston 6, as it continues to move in the direction of the left hand, will be permitted to pass through the O-ring 27. As the piston 6 thus passes through the O-ring 27, the O-ring 27 cooperates with the periphery of the piston 6 to form a fluid pressure seal between the chamber 25 and the chamber 22 to trap the hydraulic fluid present in the chamber 22 and prevent the escape of this fluid from the chamber 22 back into the chamber 25.

As the pistons 4 and 6 continue to be displaced in the direction of the left hand in response to the supply of fluid under pressure to the chamber 16, the hydraulic fluid trapped in the chamber 22 will be forced from this chamber through the passageway 31 to the chamber 32. Since a hydraulic fluid is incompressible, a build-up of pressure will occur on the left-hand side of the brake applying piston 7. When this force has increased to a value sufficient to overcome the force of the brake release spring 59, the piston 7 will be displaced in the direction of the right hand (Fig. 2) as the pistons 4 and 6 are displaced in the direction of the left hand.

As the piston 7 is displaced in the direction of the right hand, the connection between the piston 7 and the brake lever 36 provided by the piston rod 33 effects clockwise (as viewed in Fig. 2) rocking of the brake lever 36. Since the brake lever 36 and arm 38 are integral with the hub 37, and the hub 37 and brake arm 43 are both mounted on the shaft 40 to rotate therewith, the arms 38 and 43 will be rocked counterclockwise (as viewed in Fig. 3) against the force of spring 59 simultaneously as the brake lever 36 is rocked clockwise (as viewed in Fig. 2). The arm 43, by reason of its connection with the brake shoe 47 through the brake head 46 and bolt 44 is thus rendered effective to move the shoe 47 into contact with the tread 48 of the wheel 49 and apply a braking force thereto for effecting an application of the brakes in the well-known manner.

As the arm 38 is rocked (counterclockwise as viewed in Fig. 3) the spring 58 will maintain the locking pawl 53 in engagement with the tooth 56, as shown in Fig. 3, and move the locking pawl in the direction of the left hand until the right-hand end of the elongated slot 55 in the locking pawl contacts the pin 54. The length of the slot 55 and the distance between the crowns of two adjacent teeth on the toothed rack 57 is such that, without appreciable wearing away of the brake shoe 47, the brake shoe can be brought into braking contact with the tread 48 of the wheel 49 and a brake application effected without the arm 38 being rocked counterclockwise, after pin 54 contacts the right-hand end of slot 55, through an angle equal to the included angle between the crowns of two adjacent teeth. Therefore, until the brake shoe 47 wears away more than a chosen amount, the locking pawl 53 will not be ratcheted over the tooth 56 and into engagement with the next adjacent tooth on the rack 57.

In order to maintain the brake shoe 47 against the tread 48 of the wheel 49 as the shoe 47 wears away, the brake lever 36 will rock in a clockwise direction about a pivot constituted by the bearings (not shown) mounted in the sidewalls 41 and 42 of the casing, and the piston 7 will move farther in the direction of the right hand to compensate for such wear. This additional rocking of the brake lever 36 will be transmitted through the hub 37 to rock the arms 38 and 43 to maintain the shoe 47 in contact with the tread 48 of the wheel 49. This rocking of the arm 38 will be relative to the pin 54 which is carried by the casing 1. Since the pin 54 is already in contact with the right-hand end of slot 55, the spring 58 cannot move pawl 53 any further in the direction of the left hand. Therefore, when the brake shoe wears away sufficiently for the arm 38 to be rocked counterclockwise through an angle equal to the included angle between the crowns of two adjacent teeth on the toothed rack 57, the tooth 56 will be ratcheted over pawl 53 and the pawl 53 will move into engagement with the next adjacent tooth to the right of the tooth 56. It may be noted that if the wear of the shoe 47 occurring during one brake application is great enough to permit the arm 38 to be rocked counterclockwise through an angle equal to any multiple of the included angle between the crowns of two adjacent teeth, the same number of teeth on the rack 57 will be ratcheted over the pawl 53. In actual use, however, there will seldom be, if ever, sufficient wear of the brake shoe 47 during one brake application to permit more than one tooth on the rack 57 to be ratcheted over the pawl 53.

Upon a subsequent release of fluid under pressure from the chamber 16 for effecting a release of brakes, release spring 11 will move the pistons 4 and 6 in the direction of the right hand (as viewed in Fig. 2) toward their release position in which they are shown in Fig. 2. As pistons 4 and 6 move toward their release position, the piston 7 will be moved in the direction of the left hand by spring 59 (as viewed in Fig. 2) until the pawl 53 engages the left-hand side of the tooth on rack 57 with which the pawl is in engagement at the time the release of brakes is effected, to prevent further clockwise rocking of arms 38 (as viewed in Fig. 3).

Since the chambers 22 and 32 and passage 31 are filled with a liquid, when movement of piston 7 in the direction of the left hand is halted by the pawl 53 engaging a tooth on the rack 57, the continued movement of pistons 4 and 6 in the direction of the right hand by the strong release spring 11 will create a vacuum in the chamber 22 until the end of piston 6 has moved to the right of O-ring 27 and uncovered the ports 21. After the ports 21 are thus uncovered, hydraulic fluid will flow from the chamber 25 through port 24, passageway 23 and ports 21 to the chamber 22 until the pistons 4 and 6 reach their release position, in which position they are shown in Fig. 2, and the chambers 22 and 32 are completely filled.

It may be noted that an O-ring 61 carried by the piston 7 may not always provide a perfect seal with the wall of bore 8 and air at atmospheric pressure may leak past this O-ring to the chamber 32 before the left-hand end of piston 6 is moved to the right of O-ring 27 to destroy the partial vacuum present in the chamber 22. Should this occur, this air, which may be entrained in the hydraulic fluid in the chambers 22 and 32 in the form of small bubbles of gas, upon the end of piston 6 moving to the right of O-ring 27, may rise to the surface of the hydraulic fluid in reservoir 25 by flowing from the chamber 22 through the ports 21, the passageway 23 and port 24. Since the reservoir 25 is open to atmosphere through a vent hole 62 in filling cap 26, the pressure above the level of the hydraulic fluid in the reservoir 25 cannot increase above atmospheric pressure as a result of leakage past the O-ring 61.

When a subsequent brake application is made, fluid under pressure will be supplied from the usual air brake system on the railway freight car through the pipe 17a and port 17 to the chamber 16. Fluid under pressure thus supplied to the chamber 16 will be effective to displace the pistons 4 and 6 in the direction of the left hand to effect a brake application in substantially the same manner as has hereinbefore been described. Should, during this brake application, the brake shoe 47 wear away sufficiently, the pawl 53 will ratchet over another tooth on the rack 57. Consequently, when the brakes are again released, the piston 7 will occupy a position slightly to the right of the position it occupied when previously in its release position. Therefore, it should be understood that the length of the bore 8 in the bushing 9 is made sufficient to provide for the relative movement between the piston 7 and the bushing 9 occurring as a result of the wearing away of the shoe 47, in addition to the normal relative movement required to effect engagement of the brake shoe with the wheel tread.

There is disclosed in Fig. 4 a novel resilient locking member 63 which may be used in place of the pin 34 shown in Fig. 2 for connecting one end of the piston rod 33 to the piston 7. The resilient locking member 63 comprises a hollow sleeve 64 having at one end an annular inturned flange 65 which is semicircular in cross section. The sleeve 64 intermediate its ends is provided with an annular external flange 66 which also is semicircular in cross section.

The piston rod 33 is provided on its periphery near its left-hand end with a peripheral groove 67 having a semicircular cross section substantially the same as that of the inturned flange 65 on the locking member 63. The piston 7 is provided with a counterbore 68 having a dished bottom 69. Formed in the wall of the counterbore 68 intermediate the ends thereof is a groove 70 having a semicircular cross section substantially the same as that of the external flange 66 formed on the sleeve 64.

When the locking member 63 is used for connecting the piston rod 33 to the piston 7, the locking member, the piston rod 33, and the piston 7 are assembled together by first slipping the right-hand end of the locking member 63 over the left-hand end of the piston rod 33 until the inturned flange 65 is snapped into the groove 67 in the piston rod. With the locking member 63 thus secured to the piston rod 33, the left-hand end of the locking member is inserted into the counterbore 68 in the piston 7. The locking member 63 is then pushed into the counterbore 68 until the external flange 66 on the locking member 63 is snapped into the groove 70 and the spherical end of the rod 33 rests in the dished bottom 69 in the piston 7. The piston 7 can then be inserted into the bore 8 in the bushing 9 and the right-hand end of piston rod 33 connected to the lever 36 by the pin 35 as shown in Fig. 2.

*Figures 5 to 8*

The hydro-pneumatic brake unit shown in Figs. 5 to 8 inclusive is generally similar to that shown in Figs. 1 to 3 inclusively, except that the axis of a hydro-pneumatic brake application and release portion 71 (Fig. 5) is arranged at right angles to the axis of an hydraulic brake applying portion 72 (Fig. 6) instead of parallel to the axis of the brake applying portion as is shown in Fig. 2.

Figure 5:
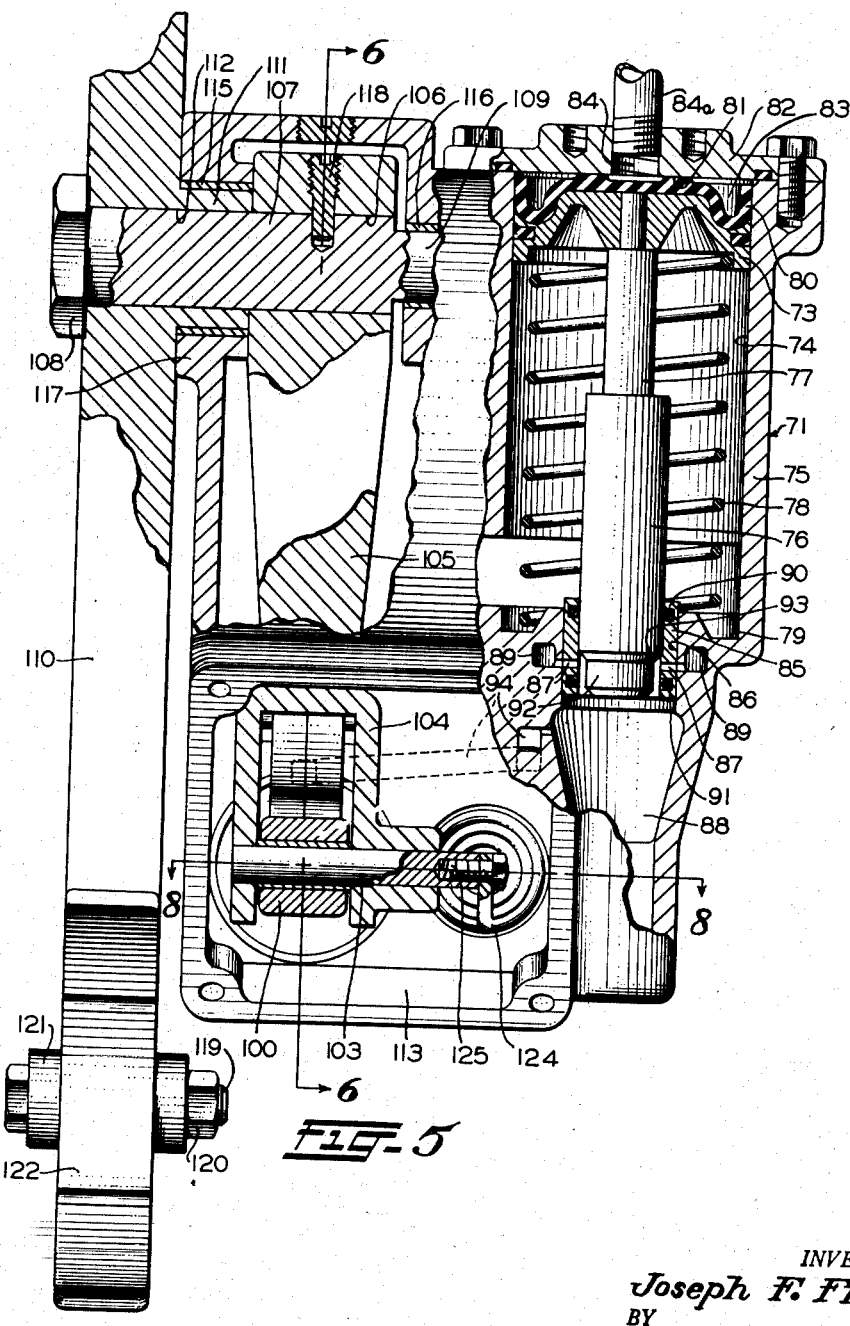
Fig. 5 is an end elevational view, partially in section, of a brake unit embodying another form of the invention in which the pneumatic fluid motor and the hydraulic fluid motor are located differently than in Fig. 2.

The hydro-pneumatic brake application and release portion 71 is shown in detail in Fig. 5, and comprises a pneumatic pressure actuated power piston 73 slidably mounted in a bore 74 formed in a body 75, and a coaxial master hydraulic piston 76 connected to the piston 73 by a rod 77.

A spring 78 interposed between the piston 73 and a wall 79 located at the lower end of bore 74 serves to yieldingly bias pistons 73 and 76 in a brake releasing direction to the position in which they are shown in Fig. 5 of the drawings.

Formed on a packing cup 80 secured to the piston 73 are a plurality of lugs 81 which, when the piston 73 occupies the position in which it is shown in Fig. 2, contact an end cover or pressure head 82 to form a pressure chamber 83 to which fluid under pressure may be supplied through a port 84 and a pipe 84a which is connected by means of a flexible hose (not shown) to the brake cylinder port of the control valve of the usual air brake system on a railway freight car.

A bushing 85 is press fitted into a bore 86 in the body 75, said bore being coaxial with the bore 74 and adapted to slidably receive the lower end of the master hydraulic piston 76. A plurality of radial ports 87 in the bushing 85 connect the interior bore of the bushing and a connected chamber 88 formed in the body 75 to an annular passageway 89 formed in the body 75 and extending circumferentially around the bushing 85. The passageway 89 is connected to a vented oil reservoir (not shown) similar to the oil reservoir 25 shown in Fig. 2.

The bushing 85 is provided intermediate its ends and on opposite sides of ports 87 with two axially spaced-apart resilient O-rings 90 and 91 disposed in corresponding annular recesses open to the interior peripheral surface of the bushing. These O-rings have sealing and sliding contact with the periphery of piston 76 and serve the same purpose as the O-rings 27 and 28 shown in Fig. 2. The lower end of the piston 76 is provided with a cylindrical reduced portion 92 which is connected by a conical portion 93 to the remainder of the piston. This conical portion serves to squeeze the O-rings 90 and 91 into their respective annular recesses as the pistons 73 and 76 move downward.

The chamber 88 is connected by a cored passageway 94 in the body 75 to a chamber 95 (Fig. 6) in the hydraulic brake applying portion 72 and formed between the left-hand face of an hydraulic pressure actuated brake applying piston 96 and the end of a bottomed bore 97 in the body 75. The passageway 94 permits flow of hydraulic fluid from chamber 88 to chamber 95 to move piston 96 in the direction of the right hand when piston 76 (Fig. 5) is moved downward in response to the supply of pneumatic fluid under pressure to chamber 83.

The hydraulic brake applying piston 96 is slidably mounted in a bore 98 in a bushing 99 pressed into the bottomed bore 97 in the body 75. A piston rod 100 having a rack 101 formed on its upper side is pivotally connected at one end to piston 96, as by a pin 102, and at the other end, as by a pin 103, to a clevis 104 formed at one end of a brake lever 105. The opposite end of the brake lever 105 is provided with a square bore 106 to permit the lever to be mounted on a square portion of a shaft 107. The left-hand end of the shaft 107 has formed integral therewith a bolt head 108 (Fig. 5) and the right-hand end has a cylindrical portion 109, the diameter of which is less than the length of one side of the square portion.

In assembling the brake unit, a brake arm 110 provided intermediate its ends with a hub 111 having a square bore 112 therein is first mounted on the square portion of the shaft 107 with the side of the brake arm 110 opposite the hub 111 adjacent the bolt head 108. The brake lever 105 is then placed within the body 75 through an opening 113 which may be closed by a cover 114. The lever 105 is then so located that the square bore 106 in the lever 105 is coaxial with two coaxial bearings 115 and 116 of unequal size carried by the body 75. The inside diameter of the bearing 115 is substantially the same as the outside diameter of the hub 111 on the brake arm 110, and the inside diameter of the bearing 116 is substantially the same as the outside diameter of the cylindrical portion 109 of the shaft 107.

With the brake arm 110 assembled on the shaft 107, the shaft is held coaxial with the bearings 115 and 116. Then the cylindrical portion 109 of the shaft 107 is first passed through the bearing 115 and the square bore 106 in the brake lever 105, and then inserted into the bearing 116. As the cylindrical portion 109 of shaft 107 enters into the bearing 116, the square portion of the shaft enters the square bore 106 in the brake lever 105 and the hub 111 of the brake arm 110 enters into the bearing 115. The shaft 107 is then pushed in the direction of the right hand (as viewed in Fig. 5) until the right-hand side of the brake arm 110 rests against a boss 117 formed on the body 75 and surrounding the hub 111 on the brake arm 110. The brake arm 110 and brake lever 105 are then locked in their assembled positions on the shaft 107 by a locking pin 118 having an unthreaded portion extending in a recess in shaft 107 and a threaded portion having screw-threaded engagement with the lever 105.

The lower end of brake arm 110 has pivotally mounted thereon, as by a bolt 119, and a nut 120, a brake head 121 which carries a composition-type brake shoe 122 for contacting the tread of a railway car wheel.

Disposed in a cylindrical chamber 123 (Fig. 8) formed in the body 75 and having its axis in spaced parallel relation to the axis of chamber 95 is a brake release spring 124 which serves to yieldingly bias the brake lever 105, the piston 96, the brake arm 110 and the connected brake shoe 122 in a brake release direction to the position in which the brake lever 105 and piston 96 are shown in Fig. 6. One end of the spring 124 is connected to one end of the pin 103 by a cap screw 125 having screw-threaded engagement with the pin 103. The opposite end of spring 124 surrounds and is anchored to an adjustable spring seat 126 which has screw-threaded engagement with a flat head machine screw 127. The head of the machine screw 127 is disposed outside of the chamber 123 in a countersunk recess formed in the body 75. The threaded stud portion of machine screw 127 extends through a bore 128 to the interior of the chamber 123. This construction enables the tension of the release spring 124 to be varied by inserting a screwdriver into the slot in the head of the machine screw 127 and rotating the machine screw to move the spring seat 126 along the machine screw relative to the body 75 and the opposite end of the spring 127 which is anchored to the pin 103.

The slack adjusting mechanism for the brake unit shown in Figs. 5 to 8 inclusive, comprises, in addition to the rack 101, two locking pawls 129, 130, the arm of the latter being longer than that of the former. The pawls 129 and 130 are pivotally mounted in side by side relation at one end on a rotatable shaft 131 extending through elongated slots 132 and 133 of equal length provided in the respective pawls 129 and 130 adjacent said one end. The other end of each of the pawls 129 and 130 is adapted to engage a tooth on the rack 101.

In assembling the slack adjusting mechanism, a yoke member 134 having a hollow sleeve member 135 formed integral therewith is inserted through an opening 136 (see Fig. 6) into a chamber 137 within the body 75. The hollow sleeve member 135 is then pushed into a bore 138 in body 75 and opening from the chamber 137 to the exterior of the body. The two pawls 129 and 130 are then inserted through the opening 136 into the chamber 137 and placed in a position in which the elongated slots 132 and 133 are coaxial with the hollow sleeve member 135. The shaft 131 is then inserted through the hollow sleeve member 135, the elongated slots 132 and 133 and a bore 139 in the body 75. With the shaft 131 in this position, it is secured to the sleeve 135 by a pin 140 which extends through the shaft and sleeve as shown in Fig. 7. The portion of the shaft 131 outside the body 75 and beyond the end of the sleeve member 135 is provided with a hole 141 and a squared end 142 to permit a mechanic to insert a rod through the hole 141 or apply a wrench to the squared end 142, and then rotate the shaft 131 and yoke member 134 in either a clockwise or counterclockwise direction.

The body 75 is provided with a second opening 143 located at one side of and adjacent to the bore 138. The opening 143 provides for the insertion of a pawl lifting pin 144 through this opening, the yoke member 134, a bore 145 in the pawl 130 substantially larger than the pin 144, and then into a bottomed bore 146 in the pawl 129, the diameter of the bottomed bore 146 being such as to provide for a driving fit with the pin 144.

In the assembled position of the pawls 129 and 130 the right-hand end of their respective arms are biased respectively (Fig. 6) by springs 147 and 148 in a clockwise direction about the shaft 131 into engagement with a tooth on the rack 101.

When the brake shoes are new and the brakes are released, the piston 96 will be moved by the released spring 124 to a release position at the left-hand end of the bore 98 in the bushing 99. When the piston 96 occupies this brake released position, the piston rod 100 and the rack 101 formed thereon will occupy a position to the left of the position in which they are shown in Fig. 6. In this brake released position of the piston 96 and the rack 101, the left-hand face of the first tooth on the right-hand end of rack 101 will be biased into engagement with right-hand end of the pawls 129 and 130 by the release spring 124 which is stronger than the springs 147 and 148. With the pawls in this position, the pin 131 contacts the right-hand end of the elongated slot 133 in the pawl 130 and occupies a position in the elongated slot 132 in the pawl 129 intermediate the ends of said slot. Since the pin 131 is in contact with the right-hand end of the slot 133 in the pawl 130 and the right-hand end of pawl 130 is in engagement with the left-hand face of the first tooth on the rack 101, the release spring 124 cannot move piston 96, rod 100 and rack 101 further in the direction of the left hand. Furthermore at this time, the pin 131 is intermediate the ends of the slot 132 in the pawl 129. Therefore, it is apparent that only pawl 130 is effective to prevent movement of the piston 96 and rod 100 in the direction of the left hand by the release spring 124.

Now let it be assumed that with the piston 96, rod 100 and pawls 129 and 130 in the brake released position described above, a brake application is made and fluid under pressure is supplied from the usual brake control valve provided on a railway car through the pipe 84a and port 84 (Fig. 5) to the pressure chamber 83 formed between the packing cup 80 and the pressure head 82. Fluid under pressure thus supplied to the chamber 83 is effective to displace the packing cup 80 and the pistons 73 and 76 downward with respect to the brake cylinder body 75 against the force of spring 78.

As the piston 76 is displaced downward, as described above, the lower end of the piston will first cover the ports 87 which control communication between the chamber 88 and the passageway 89. As the piston continues to be displaced downward, the conical portion 93 contacts the inner periphery of the O-ring 91 and forces this O-ring into the annular recess in which it is disposed until the inside diameter of the O-ring is equal to the outside diameter of the piston 76 whereupon the piston 76 passes through the O-ring, said O-ring cooperating with said piston to provide a fluid pressure seal between the chamber 88 and the passageway 89 to trap the hydraulic fluid present in the chamber 88 and prevent the escape of this fluid back into the passageway 89 and the reservoir to which this passageway is connected.

As the pistons 73 and 76 continue to move in a downward direction in response to the supply of fluid under pressure to the chamber 83, the hydraulic fluid trapped in chamber 88 will be forced therefrom through the passageway 94 to the chamber 95. The hydraulic fluid supplied to the chamber 95 will cause a build-up of a force on the left-hand face of the piston 96 in opposition to the force of the release spring 124. When this force has increased to a value sufficient to overcome the force of the spring 124, the piston 96 will be displaced in the direction of the right hand as the pistons 73 and 76 are moved downward by the fluid under pressure supplied to the chamber 83.

As the piston 96 is displaced in the direction of the right hand, the connection between the piston 96 and the lever 105 provided by the piston rod 100 effects counterclockwise (as viewed in Fig. 6) rocking of the lever 105. Since the lever 105 and brake arm 110 are both mounted on shaft 107 to rotate therewith, the brake shoe 122 will be moved into contact with the tread of a wheel (not shown) to apply a braking force thereto for effecting an application of the brakes in the well-known manner.

As the piston 96, the piston rod 100 and rack 101 are displaced in the direction of the right hand, as explained above, the tooth on the right-hand end of the rack 101 is also displaced in the direction of the right hand and away from the ends of the pawls 129, 130. As this tooth moves away from the right end of the pawls, the springs 147, 148 acting respectively on the left-hand end of the pawls 129, 130 maintains the right-hand end of both pawls in engagement with the left-hand face of the tooth until the pin 131 contacts the left-hand end of the elongated slot 132 in the pawl 129. As the rack 101 continues to move in the direction of the right hand, the right-hand end of the pawl 129 will ride up the right-hand face of the second tooth on the rack 101, and the right-hand end of the pawl 130 will be maintained in engagement with the left-hand face of the first tooth on the rack 101 by the spring 148 until the pawl 130 has been moved far enough in the direction of the right hand for the pin 131 to contact the left-hand end of the elongated slot 133 in the pawl 130. As the rack 101 continues to move in the direction of the right hand after the pin 131 has contacted the left-hand of the slot 133 in the pawl 130, the right-hand end of the pawl 130, as well as the right-hand end of pawl 129, will ride up the right-hand face of the second tooth on the rack 101.

The size of the teeth on the rack 101 and the distance between the brake shoe 122 and the tread of the wheel associated with this shoe are such that, without appreciable wear of the shoe 122, the shoe will contact the wheel and a brake application will be effected without the right-hand end of the pawl 129 reaching the upper end of the right face of the second tooth on the rack 101. Therefore, neither pawl is ratcheted over the second tooth on the rack 101 until the brake shoe 122 wears a certain chosen amount.

When a release of the brakes is effected, fluid under pressure is vented from the chamber 83 through the brake system on the car. As fluid under pressure is thus vented from the chamber 83, the spring 78 moves the pistons 73 and 76 upward until they occupy the released position in which they are shown in Fig. 5. As piston 76 moves upward, the volume of chamber 88 is increased. Consequently hydraulic fluid will be forced by the piston 96 from the chamber 95 through the passageway 94 to the chamber 88 to maintain this chamber completely filled with fluid since release spring 124 acting through pin 103 and piston rod 100 constantly biases piston 96 in the direction of the left hand as viewed in Fig. 6.

As the piston 96, the piston rod 100, and the rack 101 formed on said rod are moved in the direction of the left hand by the spring 124 in response to the increase in the volume of chamber 88, the right-hand ends of the pawls 129 and 130 ride down the right-hand face of the second tooth on the rack 101, the end of the pawl 130 leading the end of the pawl 129 since the pawl 130 is longer than the pawl 129, until the end of the pawl 130 engages the left-hand face of the first tooth on the rack 101. As the rack 101 continues to move in the direction of the left hand, the first tooth on the rack, by virtue of its engagement with the right-hand end of the pawl 130, carries the pawl 130 in the direction of the left hand against the force of the spring 148 until the left-hand face of the first tooth on the rack 101 engages the right-hand end of the pawl 129, after which the pawls 129 and 130 are both carried in the direction of the left hand against the force of the respective springs 147 and 148 until the right-hand end of the slot 133 in the pawl 130 contacts the pin 131. The contaction of the right-hand end of the slot 133 in the pawl 130 with the pin 131 prevents further movement of the pawl 130 in the direction of the left hand. Since the right-hand end of the pawl 130 is in engagement with the left-hand face of the first tooth on the rack 101, the rack 101, the piston rod 100, and piston 96 are prevented from moving further in the direction of the left hand and consequently are now in their original released position.

Now let it be assumed that the brakes are applied and that, during the application, the brake shoe 122 wears an appreciable amount. As hereinbefore explained, when a brake application is made, the piston 96, rod 100 and rack 101 are displaced in the direction of the right hand and the right-hand ends of the pawls 129 and 130 ride up the right-hand face of the second tooth on the rack 101 with the end of the pawl 130 trailing the end of the pawl 129. Therefore, as the shoe 122 wears away, the rack 101 will continue to move in the direction of the right hand until the right-hand end of the pawl 129 reaches the upper end of the right-hand face of the second tooth on the rack 101 and drops over this tooth into engagement with the right-hand face of the third tooth on the rack 101. Since the pawl 130 is longer than the pawl 129, the right-hand end of this pawl 130 is still in engagement with the right-hand face of the second tooth on the rack 101.

If a brake release is made while the right-hand end of pawl 129 is in engagement with the right-hand face of the third tooth on the rack and the right-hand end of pawl 130 is in engagement with the right-hand face of the second tooth, and intermediate the ends of said right-hand face, the release spring 124 will move piston 96, rod 100, rack 101 and pawl 129 in the direction of the left hand until the pin 131 contacts the right-hand end of elongated slot 132 in pawl 129. The contaction of the right-hand end of the slot 132 in the pawl 129 prevents further movement of the pawl 129 in the direction of the left hand, and as the right-hand end of the pawl 129 is in engagement with the right face of the third tooth and in abutting relation with the left-hand face of the second tooth on the rack 101, the rack 101, rod 100 and piston 96 are prevented from being moved further in the direction of the left hand by the release spring 124. Consequently, piston 96 does not return to its original released position but now occupies a position to the right of its original released position.

When releasing the brakes, the spring 78 moves the pistons 73 and 76 upward as fluid under pressure is vented from the chamber 83, and as piston 76 is thus moved upward the volume of chamber 88 is increased to permit spring 124 to move the piston 96 in the direction of the left hand to force the hydraulic liquid in the chamber 95 from said chamber through the passageway 94 into the chamber 88 to maintain the chamber 88 full of liquid as the volume of the chamber 88 increases.

Since the piston 96 is not returned to its original released position, as explained above, but is stopped in a position at the right of its original released position, before the pistons 73 and 76 reach their original released position, the flow of hydraulic fluid from chamber 95 to the chamber 88 will cease when the piston 96 is stopped, and the piston 76 will create a vacuum in the chamber 88 as it is moved toward its released position by the spring 78 which is sufficiently strong to move the pistons 73 and 76 to this position, in which position they are shown in Fig. 5, against the vacuum thus created in the chamber 88.

As the piston 76 is moved upward by the spring 78, and just prior to reaching its original released position, the lower end thereof will uncover the ports 87 in the bushing 85. When the ports 87 are thus uncovered, hydraulic fluid will flow from the reservoir (not shown) through the passageway 89 and the ports 87 to the chamber 88 to completely fill this chamber with hydraulic fluid and destroy the vacuum therein.

With the chamber 88 completely filled with hydraulic fluid, as explained above, when a subsequent brake application is made, fluid under pressure supplied to the chamber 83 will operate the pistons 73, 76 and 96 to effect a brake application in the manner hereinbefore explained.

As the piston 96 moves in the direction of the right hand to effect a brake application, the rack 101 formed on the piston rod 100 also moves in the direction of the right hand, whereupon the pawl 129 is moved in the direction of the right hand by the spring 147 as the left-hand face of the second tooth on the rack moves away from the right-hand end of the pawl 129 until the pin 131 contacts the left-hand end of the slot 132 in the pawl. Also, as the rack 101 is moved in the direction of the right hand, the right-hand end of the pawl 130 rides up the right-hand face of the second tooth on the rack until the brake shoe 122 contacts its associated wheel.

Now let it be assumed that the brake shoe 122 wears away to permit the piston 96 to move the rack 101 further in the direction of the right hand. As the rack 101 thus moves in the direction of the right hand, the left-hand face of the second tooth on the rack moves away from the right-hand end of the pawl 129 whereupon the right-hand end of the pawl 129 rides up the right-hand face of the end of the third tooth on the rack. Simultaneously, as the rack 101 moves in the direction of the right hand, the right-hand end of the pawl 130 continues to ride up the right-hand face of the second tooth on the rack 101. When the shoe 122 has worn away sufficiently for the rack 101 to be moved far enough in the direction of the right hand for the right-hand end of the pawl 130 to ride up the right-hand face of the second tooth on the rack 101 to reach and just pass the crown of this tooth, the right-hand end of the pawl 130 will drop over this tooth into engagement with the right-hand face of the third tooth on the rack. The right-hand ends of both pawls 129 and 130 are now in engagement with the right-hand face of the third tooth on the rack 101 with the end of the pawl 130 engaging said right-hand face at the lower end thereof and the end of the pawl 129 engaging said face intermediate the ends thereof.

If now the brakes are released, the piston 96 will be returned by spring 124 to a position at the right-hand side of the position it occupied when it was last returned to its released position and additional hydraulic fluid will be supplied to the chamber 88 in the manner hereinbefore explained to maintain the chambers 88 and 95 always completely filled.

It may be noted at this point that, if the brakes are suddenly released when the right-hand end of the pawl 130 has just reached the crown of the second tooth on the rack 101 but has not dropped over into engagement with the right-hand face of the third tooth, should the right-hand end of the pawl 130 not ride back down the right-hand face of the second tooth on the rack 101 but jump over the crown of the first tooth, then piston 96, rod 100 and rack 101 will be prevented, by the right-hand end of the pawl 129 which is at this time in engagement with the right-hand face of the third tooth on the rack intermediate the ends thereof, from being returned by the spring 124 to the position they occupied when the brake shoe 122 was new.

From the hereinbefore described operation of the pawls 129 and 130 it is apparent that as the brake shoe 122 wears away, the pawl 129 is first ratcheted over a tooth on the rack and then the pawl 130 is ratcheted over the same tooth, and the two pawls are thus ratcheted over successive teeth on the rack 101 until the brake shoe 122 has become so badly worn that it must be replaced by a new brake shoe.

When a worn brake shoe is replaced by a new brake shoe, it is necessary to disengage the pawls 129 and 130 from the rack 101 to permit the piston 96 to be returned to its original released position in order that there will be the proper amount of clearance between the brake shoe and the tread of the wheel associated with the shoe.

In order to disengage the pawls 129 and 130 from the rack 101, an operator will apply a wrench to the squared end 142 of the shaft 131 or insert a rod into the hole 141 in the shaft 131 and then rotate shaft 131 counterclockwise as viewed in Fig. 6. Since the hollow sleeve member 135 is integral with the yoke member 134 and secured to the shaft 131 by the pin 140, the sleeve member and yoke member will rotate with the shaft. Therefore, as the shaft 131 is rotated counterclockwise, the yoke member 134 will be brought into contact with the pawl lifting pin 144. As the shaft 131 continues to be rotated, the yoke member 134, acting through the pin 144, first lifts the pawl 129 and then, upon the pin 144 contacting the wall of the bore 145 in the pawl 130, lifts the pawl 130. When the shaft 131 has been rotated counterclockwise sufficiently for the right-hand ends of the pawls 129 and 130 to be raised above the crowns of the teeth on the rack 101, the brake arm 110 can be rotated to rock the shaft 107 and lever 105 clockwise as viewed in Fig. 6 to move the piston rod 100 and the piston 96 in the direction of the left hand until the piston reaches the left-hand end of bore 98 in bushing 99 and contacts the end wall of the bottomed bore 97. The wrench may now be removed from the squared end 142 or the rod withdrawn from the hole 141 in shaft 131 whereupon the right-hand ends of the pawls 129 and 130 will drop into engagement with the right-hand face of the second tooth and the left-hand face of the first tooth on the right-hand end of the rack 101.

When the worn brake shoe 122 has been replaced with a new brake shoe, the piston 96 moved into contact with the end wall of the bottomed bore 97, and the right-hand end of the pawls 129 and 130 returned to engagement with a tooth on the rack 101, the brake unit is ready for service.

Having now described the invention, what I claim as new and desire to secure by Letters Patent, is:

1. A hydro-pneumatic brake unit for applying a braking force to a wheel of a railway car truck, said unit comprising a casing immovably secured to the car truck and having a bore therein, a piston operative in said bore and movable in opposite directions responsively to application and release of pneumatic pressure to one side thereof, a second bore coaxially opening into the first said bore and of relatively small diameter compared thereto, a plunger operatively connected to said piston and operable in said second bore, a hydraulic reservoir connected to said second bore for supplying an hydraulic medium thereto and to which pressure is applied by movement of said plunger in said second bore, a third bore in said casing communicating with said second bore, a second piston movable in said third bore responsively to hydraulic pressure established in said second bore as communicated to said third bore and acting thereon, a shaft rotatably mounted in said casing and having a portion extending outside the casing, means connecting said third piston and said shaft for effecting rotation of said shaft in response to movement of said third piston, and means carried on the portion of said shaft outside the casing actuated by rotation of said shaft for exerting a brake applying force on a wheel to be braked.

2. A hydro-pneumatic brake unit as defined in claim 1, and having slack adjusting means operatively responsive to rotation of said shaft through more than a certain angle in a brake applying direction to limit the return movement of said shaft in a brake releasing direction to an angle not greater than said certain angle.

3. A hydro-pneumatic brake unit as defined in claim 2, in which the slack adjusting means comprises an arm attached to and rotated by said shaft, said arm having at the free end thereof an arcuate toothed segment, a pawl member having a pivotal lost-motion connection with said casing at one end and having a biased engagement at its free end with said toothed segment, the lost motion pivotal connection of said pawl member permitting limited movement of the pawl member responsively to movement of said arm rotatively with said shaft following which movement of said pawl relatively to said toothed segment occurs, movement of said pawl member relative to said segment exceeding the tooth pitch thereof resulting in engagement of said pawl member with a succeeding tooth of said segment, return rotary movement of said shaft being thereby limited to an angle less than the angle through which said shaft rotated in a brake applying direction.

4. A hydro-pneumatic brake unit for applying a braking force to a wheel of a railway car truck, said unit comprising a casing immovably secured to the car truck and having a first bore therein, a first piston operable in said bore and movable in opposite directions responsively to the application and release of pneumatic pressure to one side thereof, a second bore in said casing coaxially opening into the first said bore and of relatively small diameter compared thereto, a plunger operatively connected to said first piston and operable in said second bore, an hydraulic reservoir connected to said second bore for supplying an hydraulic medium thereto, said hydraulic medium in said second bore having pressure created therein in response to movement of said plunger in said second bore, a third bore in said casing arranged in parallel spaced-apart relation to said first and second bores and in communication with said second bore to receive hydraulic pressure therefrom, a second piston movable in said third bore responsively to the hydraulic pressure established in said second and third bores by movement of said plunger, a shaft rotatably mounted in said casing and having a portion extending outside the casing, the axis of said shaft being arranged at right angles to the axes of said three bores, means connecting said second piston and said shaft for effecting rotation of said shaft in response to movement of said second piston, and brake applying means coupled to the exterior portion of said shaft and actuated by rotation of said shaft for exerting a braking force on a wheel to be braked.

5. A hydro-pneumatic brake unit for applying a braking force to a wheel of a railway car truck, said unit comprising a casing immovably secured to the car truck and having a first bore therein, a first piston operable in said bore and movable in one direction responsively to the application of pneumatic pressure to one side thereof, a first biasing means disposed between said casing and said first piston for moving said first piston in a direction opposite to said one direction in response to the release of said pneumatic pressure from said one side of said first piston, a second bore in said casing coaxially opening into the first said bore and of relatively small diameter compared thereto, a plunger operatively connected to said first piston and operable in said second bore, a hydraulic reservoir connected to said second bore for supplying an hydraulic medium thereto, said hydraulic medium in said second bore having pressure created therein in response to movement of said plunger in said second bore, a third bore in said casing arranged in parallel spaced-apart relation to said first and second bores and in communication with said second bore to receive hydraulic pressure therefrom, a second piston movable in said third bore responsively to the hydraulic pressure established in said second and third bores by movement of said plunger, a shaft rotatably mounted in said casing and having a portion extending outside the casing, the axis of said shaft being arranged at right angles to the axes of said three bores, means connecting said second piston and said shaft for effecting rotation of said shaft in response to movement of said second piston, a second biasing means operatively connected to said shaft for yieldingly resisting rotation of said shaft responsive to hydraulic pressure on said second piston and for effecting rotation of said shaft in the opposite direction upon relief of hydraulic pressure on said second piston, and brake applying means coupled to the exterior portion of said shaft and actuated into braking engagement with a wheel to be braked or out of braking engagement therewith depending upon the direction of rotation of the shaft.

6. A hydro-pneumatic brake unit for applying a braking force to a wheel of a railway car truck, said unit comprising a casing immovably secured to the car truck and having a bore therein, a piston operative in said bore and movable in opposite directions responsively to application and release of pneumatic pressure to one side thereof, a second bore coaxially opening into the first said bore and of relatively small diameter compared thereto, a plunger operatively connected to said piston and operable in said second bore, an hydraulic reservoir connected to said second bore for supplying an hydraulic medium thereto to which hydraulic medium pressure is applied by movement of said plunger in said second bore, a third bore in said casing communicating with said second bore, a second piston movable in said third bore responsively to hydraulic pressure established in said second bore as communicated to said third bore and acting thereon, a shaft rotatably mounted in said casing and having a portion extending outside of said casing, the axis of said shaft being arranged at right angles to the axes of said three bores, an arm rigidly mounted on said shaft within the casing, a link pivotally connected at one end to said second piston and at the other end to said arm, a lever secured to said shaft on the outside of said casing and arranged to exert a brake applying force on a brake device associated with said car wheel, and a slack adjuster means comprising a toothed rack and pawl means, said rack being carried on said link and said pawl means having at one end a pivotal lost motion connection with the casing of said brake unit and biased at the other end into engagement with said toothed rack, the lost motion pivotal connection of said pawl means permitting a normal brake applying movement of said third piston without said pawl means being ratcheted with respect to said toothed rack and providing for said pawl means to be ratcheted with respect to said toothed rack upon the amount of movement of said third piston exceeding said normal brake applying movement.

7. A hydro-pneumatic brake unit as defined in claim 6, wherein the said pawl means comprises a pair of pawl members of unequal length each having a pivotal lost-motion connection at one end with said casing and a spring-biased engagement at their free end with said toothed rack, the lost motion connection permitting limited movement of the toothed rack relative to both pawl members without either pawl member being ratcheted into engagement with the next adjacent tooth on said toothed rack and providing for the ratcheting of the shorter of said pawl members over the said next adjacent tooth prior to the ratcheting of the longer of said pawl members over the said next adjacent tooth upon the movement of said rack exceeding said limited movement.

References Cited in the file of this patent

UNITED STATES PATENTS

| | | |
|---|---|---|
| 2,511,336 | Hudson | June 13, 1950 |
| 2,514,588 | Nystrom et al. | July 11, 1950 |
| 2,561,454 | Williams | July 24, 1951 |